United States Patent [19]

Dickopp et al.

[11] Patent Number: 5,384,811
[45] Date of Patent: Jan. 24, 1995

[54] METHOD FOR THE TRANSMISSION OF A SIGNAL

[75] Inventors: Gerhard Dickopp, Krefeld-Bockum; Thomas Vaupel, Essen; Detlef Krahé, Kempen, all of Germany

[73] Assignee: Telefunken, Hanover, Germany

[21] Appl. No.: 853,751

[22] PCT Filed: Oct. 8, 1990

[86] PCT No.: PCT/EP90/01683
 § 371 Date: Aug. 24, 1992
 § 102(e) Date: Aug. 24, 1992

[87] PCT Pub. No.: WO91/05412
 PCT Pub. Date: Apr. 18, 1991

[30] Foreign Application Priority Data

Oct. 6, 1989 [DE] Germany .................. 3933339

[51] Int. Cl.⁶ .................. H04B 1/66; H04B 14/04
[52] U.S. Cl. .................. 375/122; 375/25; 381/29; 381/36
[58] Field of Search .................. 375/122, 27, 25; 381/29, 36, 37, 40, 31

[56] References Cited
PUBLICATIONS

"Digital Communications Fundamental and Applications" Bernard Shar, pp. 649–653, 1988.

Primary Examiner—Tesfaldet Bocure
Attorney, Agent, or Firm—Joseph S. Tripoli; Eric P. Herrmann; Ronald H. Kurdyla

[57] ABSTRACT

The process disclosed enables the "time domain aliasing cancellation" method to be extended systematically to larger block overlapping. The boundary conditions which, when using various modified transforms, the analysis and synthesis windows must comply with, can thus be given. The transform series must also be included in the design of each analysis and synthesis window in order to optimize for a given application, because this changes the boundry conditions with which an analysis window function can be determined. Design for analysis and synthesis windows have shown that analysis and synthesis properties obtained by multiple block overlapping are significantly better than those obtained by convential double block overlapping. The systematic method of the invention offers numerous possibilites for optimizing windows in special applications.

5 Claims, 11 Drawing Sheets

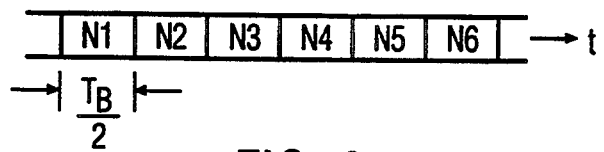
FIG. 2
BLOCK 1: [N1 | N2]  BLOCK 2: [N2 | N3]  ...ETC.
FIG. 3
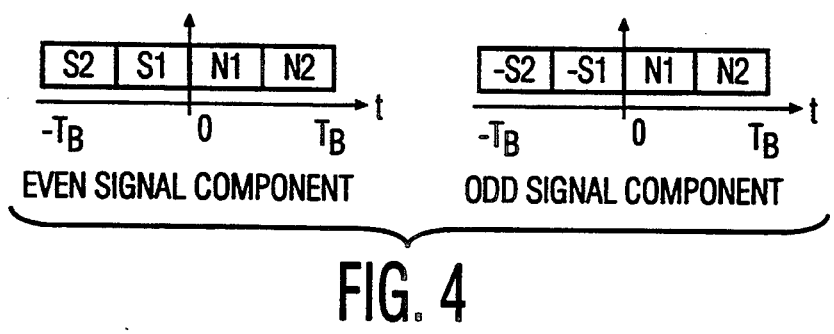
FIG. 4

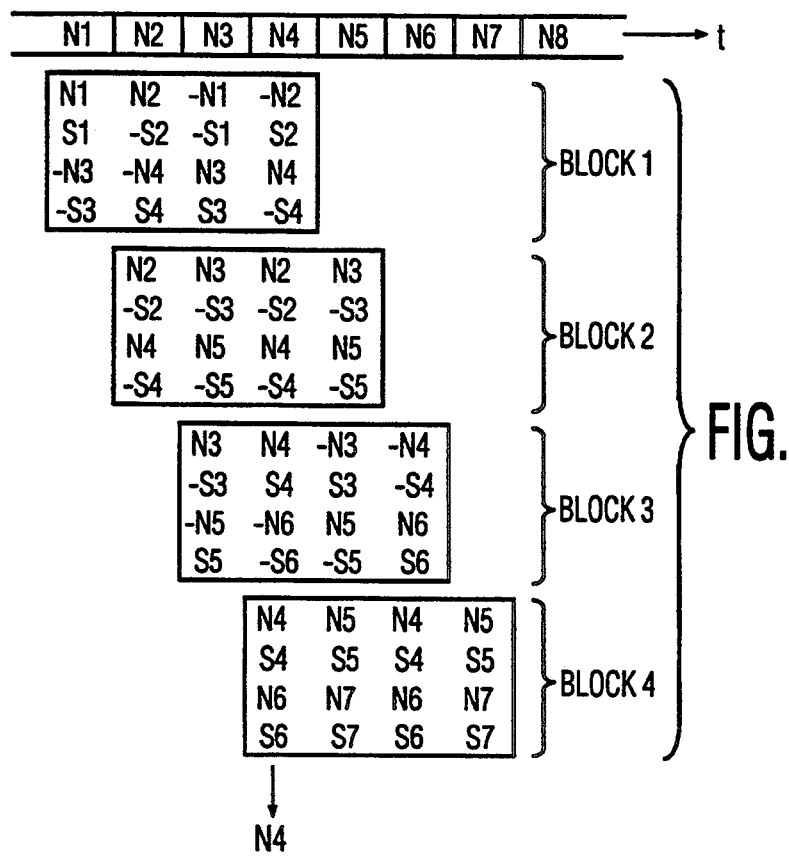
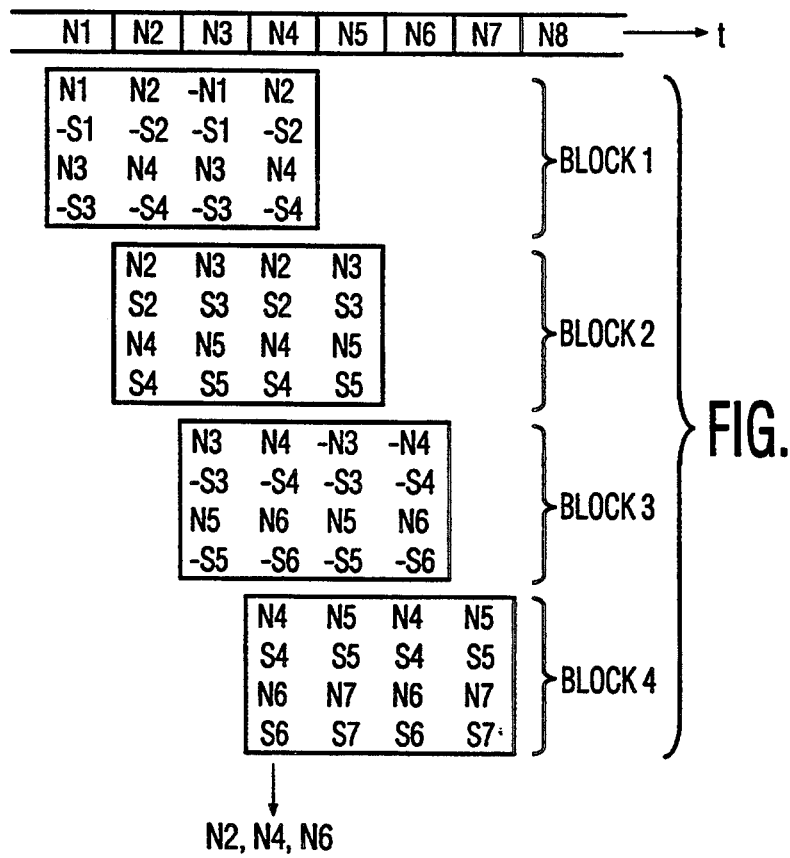

METHOD FOR THE TRANSMISSION OF A SIGNAL

BACKGROUND OF THE INVENTION

This invention is directed to a method of transmitting a signal using digital compression techniques. In the transmission of an audio signal, for example, radio broadcast transmission, cable transmission, satellite transmission and with recording devices the analog signal is converted into a digital signal with a certain resolution, transmitted in digital form and reconverted into an analog signal upon reception. A greater signal-to-noise ratio is achieved, in particular upon reproduction, by using digital transmission.

The band width required for the transmission of such a signal is essentially determined by the number of [scanning values] samples per time unit which are to be transmitted. The resolution is also a function of the number of [scanning values] samples transmitted.

In practice it is preferable to keep the transmission band width as narrow as possible in order to be able to transmit as many audio signals as possible simultaneously via a wide band channel. It would appear that the necessary band width can be reduced by decreasing the number of [scanning values] samples or the number of bits per [scanning value] sample. However, in general this measure results in a deterioration in the quality of the reproduction.

A method described in DE-OS 35 06 912, improves the quality of the reproduction by separating the digital audio signal into successive temporal segments and transforming the audio into a short-time spectrum which represents the spectral components of the signal for the respective time segments. Generally, in the short-time spectrum, for reasons of psychoacoustic laws, components which are not perceived by the listener, i.e., are irrelevant from a communications technology viewpoint, can be discovered more readily than in the time domain. Upon transmission these components are given less weight or are left out entirely. In doing this a considerable part of the otherwise necessary data can be left out so that the average bit rate can be considerably reduced.

To form the time segments, the signal is first evaluated in the temporal region (time domain) using an analysis window and after transformation, coding, transmission, decoding and inverse transformation, is finally evaluated using a synthesis window. The design of the analysis window influences the frequency resolution. The advantage of a high frequency resolution is that with narrow band signal components only a small amount of data is required for their coding, thereby achieving a very effective bit allocation, and the average data quantity which is needed for transmission is considerably reduced. Therefore, for windows with "hard" edges, such as exhibited by a rectangle, the frequency resolution is poor. This is because the spectral components caused by the extreme rise and fall of the signal at the start and end of the window are added to the spectrum of the original signal in the evaluated segment. However, the temporal segments can be joined to each other without overlaps.

With the method described in DE-OS 35 06 912, a window function with "softer" edges was already selected. Here, the start and the end of the analysis window follow a cosine [square] function and the corresponding regions of the synthesis window a sine [square] function. The central area of both windows has a constant value. The use of such a window function design results in an improved frequency resolution. However, in the region of the "soft" edges overlapping of the successive temporal segments is necessary, and this leads to an increase in the average bit rate due to the doubled transmission of the signals contained in this region.

A further improvement in the frequency resolution could be achieved by using an even lower edge gradient for the window function of the analysis window as well as by expanding the edge region within the window. However, with these measures increased overlapping with neighboring temporal segments is required.

If the edge region is expanded so far that the window functions no longer have a constant value in any region, then adjacent temporal segments must overlap each other by 50 per cent. This means that the number of [scanning values] samples and, accordingly the quantity of data, is doubled.

From the publication of J. P. Pfineen and A. B. Bradley "Analysis/Synthesis Filter Bank Design Based on Time Domain Aliasing Cancellation", IEEE Transactions, ASSP-34, No. 5, October 1986, pp. 1153 through 1161, and that of J. P. Princen, A. W. Johnson and A. B. Bradley "Suband/Transform Coding Using Filter Bank Design Based on Time Domain Aliasing Cancellation", IEEE Int. Conference on Acoustics, Speech and Signal Processing 1987, pp. 2161 through 2164, it is known with a 50 per cent overlap of successive temporal segments to reduce the quantity of data to the original value again, in that only every second [scanning value] sample is encoded. In the spatial domain every sample is encoded (if data reduction is not considered). Sub-sampling is performed in the spectral domain. The sub-sampling process is explained at page 1154 and 1155 of the Princen and Bradley reference noted above. This proposal is based on equal window functions for the analysis and synthesis windows. In the case of equal window functions, the aliasing components which appear upon [sub-scanning ([sub-sampling[)] can be compensated for by the synthesis window after the evaluation.

It was discovered that the frequency resolution can be raised by selecting larger overlapping regions if, at the same time, the signal is assessed with suitable analysis and synthesis windows. In order to reduce the climbing data rate, caused by the higher number of [scanning values] samples, to the original value, the sub-[scanning] would have to be performed using an even higher factor, whereby however, further aliasing components ensue.

SUMMARY OF THE INVENTION

It is the object of the invention to specify measures for a method for the transmission of a signal, whereby said measures are generally applicable and also enable, with multiple overlapping blocks, a reduction in the number of [scanning values] samples and, therewith, in the data rate with simultaneous compensation of the aliasing components caused by sampling in the frequency domain. Compensation of such aliasing is achieved by arranging aliasing Components SO as to cancel during inverse processing at a receiver.

The method makes it possible to specify the general conditions for the transformations of overlaps which correspond to a power of two, i.e., for a double, quadruple, eightfold overlap, etc., and to utilize these with a practical arrangement. Further developments of the method provide for also determining the general conditions for various analysis and synthesis windows and using these in practical application.

Through applying the procedure steps according to the invention it is possible to take advantage of the analysis characteristics of softer analysis window functions improving with increasing overlapping. Through corresponding sub-[scanning] sampling in the [frequency range (frequency domain)] frequency domain, the effort required for multiple transmission of partial window regions is reduced to the original data rate of the [temporal] time domain signal.

Data reduction (based on the input data rate) can be achieved using known methods, for example as described in DE-OS 3506912. It is herein recognized that if overlapping windows are required for coding, the output data rate would increase in relation to the amount of overlapping. In accordance with the principles of the present invention there is disclosed herein a system for significantly reducing or substantially avoiding such a data rate increase, particularly in the case of a significant amount of overlapping, thereby maintaining high signal quality.

[In the drawings:]

BRIEF DESCRIPTION OF THE DRAWINGS

FIG. 2 shows a graphic representation of the segmentation of the continuous temporal signal, FIG. 3 is a block formation from the segmented original signal, FIG. 4 shows an even and an odd block signal component, FIG. 15 shows aliasing compensation with rectangular window for analysis and synthesis, FIG. 16 shows a compensation scheme for the alternating application of sine and cosine transformation.

DESCRIPTION OF THE PREFERRED EMBODIMENTS

Figure 1:
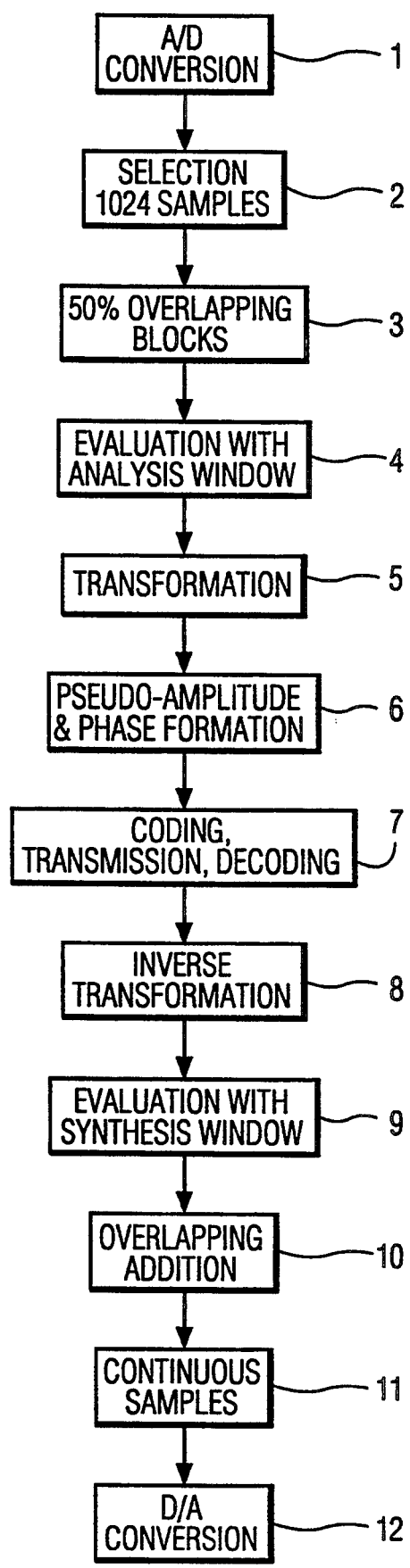
FIG. 1 is a flow diagram with the main procedure steps of the invention

FIG. 1 shows the method steps according to the invention. Steps 7–12 include operations which are the inverse of operations performed in steps 1–7. Briefly, after analog-to-digital conversion in step 1, in steps 2 and 3 overlapping blocks each having groups of a fixed number of 1024 values are selected and subjected to a window analysis in step 4. After window analysis the values of each block are processed by steps 5 and 6 before coding and transmission in step 7. This processing includes frequency transformation which produces transform output values. The transform output values are sampled or subsampled, causing aliasing. The sampled transform output values are arranged so that aliasing occurs at certain positions which result in aliasing being cancelled as a result of inverse processing e.g., at a receiver. The coding in step 7 may take the form of any well known data reduction technique, with the decoding in step 7 being the inverse of the coding technique used.

In the flow diagram illustrated in FIG. 1, the individual procedure steps for executing the method of the invention are shown. The [stating variable] source signal of the method forms an analog audio signal which is converted according to procedure step 1 into a digital signal, in which amplitude values are present as [scanning values ] samples in digital coded form. In procedure step 2 the continuous signal is windowed, in that a series of successive [scanning values] samples, in the ease presented here, 1024 [scanning values] samples, are selected. For example, a 1024 bit serial-to-parallel register can be used for receiving the continuous input sample data stream and outputting groups of 1024 samples.

In procedure step 3 blocks with temporal overlaps of 50 per cent are formed from the selected [scanning values] samples. This means that in adjacent blocks sometimes the same [scanning values] samples are present, albeit in different places. Thus, the [scanning values] samples present in the first half of a current block correspond to the [scanning values] samples present in the second half of the preceding block. The samples satisfy the Shannon theory. The overlapping is caused by taking the same sample twice, in the neighboring and overlapping blocks.

In procedure step 4 the signal segments contained in the blocks are evaluated using analysis windows. In doing this a soft signal rise and fall are created at the block boundaries which raises the analysis sharpness for the following transformation. Each analysis window is evaluated without regard to overlapping. In the evaluation, 1024 samples (which are known to be used in other windows) are selected and processed. This procedure is also used for the subsequent steps of transformation (5), coding, transmission and decoding (7) and inverse transformation (8).

Procedure step 5 forms the transformation of the existing discrete-time signal into a discrete-frequency signal. Instead of amplitude values, spectral values appear from now on which each encompass a real and an imaginary component. The outputs of a sine or cosine transform are real values. If an FFT (Fast Fourier Transform) is used for calculating the output values, imaginary components also result.

Next, the conversion of the spectral values into a presentation with [pseudoquantities] pseudo amplitude values and pseudophases takes place in procedure step 6. The spectral values are then prepared and suited for a transmission method such as is described in DE-OS 35 06 912. Sub-[scanning] sampling is also performed at the same time in connection with the conversion of the spectral values. The result is that the number of values to be transmitted again coincides with the number of original [scanning values] samples. The doubling of the data caused by the 50 per cent overlapping of the blocks is, therefore, cancelled here.

In the procedure step designated 7, several individual steps are combined encompasses the coding, if applicable the data reduction, transmission and decoding. These procedure steps can be carried out according to the method in DE-OS 35 06 912.

Figure 23:
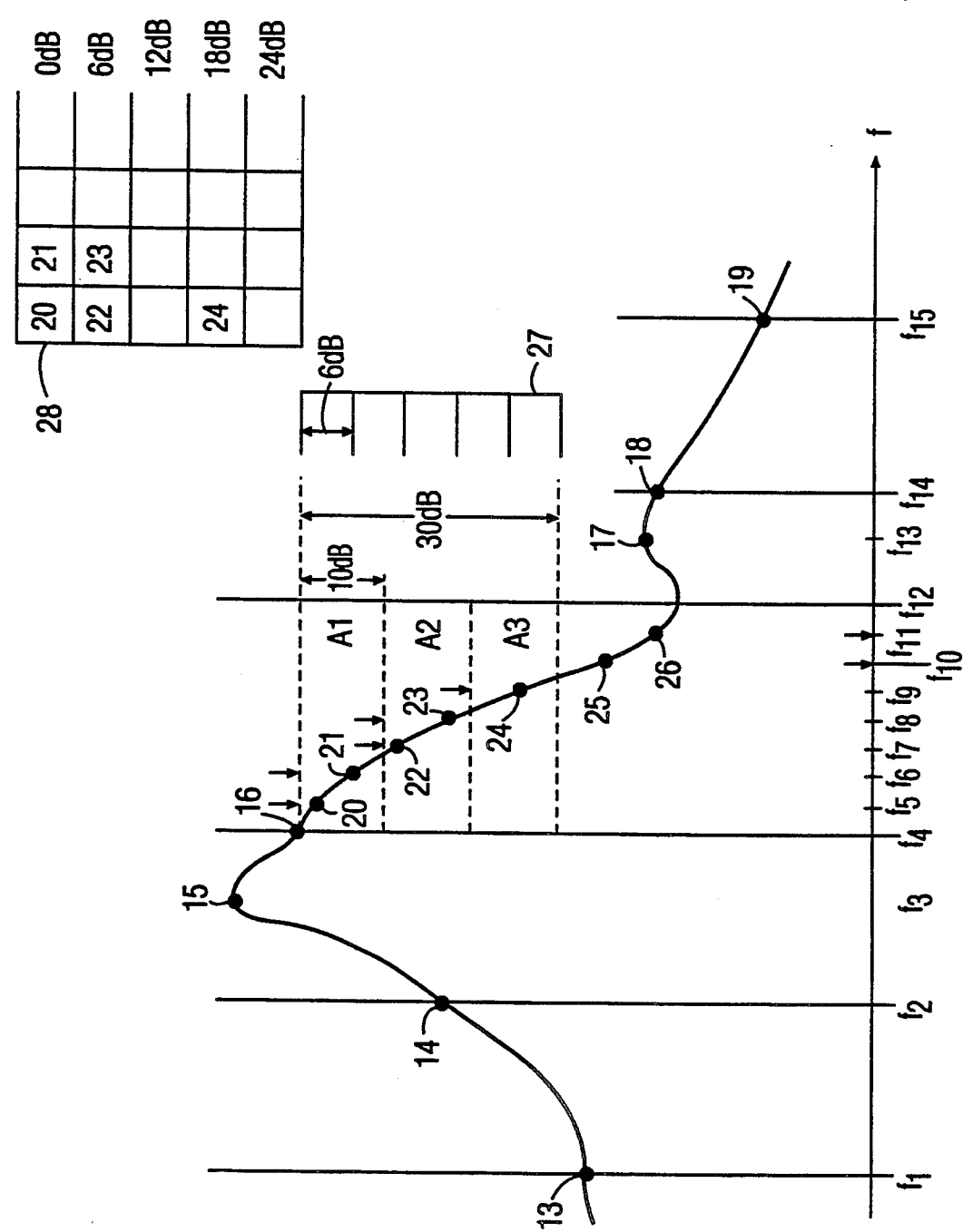
FIG. 23 is an amplitude vs. frequency plot of spectral lines of a short-time frequency spectrum.

Regarding the processing in steps 6 and 7, as discussed in DE-OS 3506912, after spectral transformation in step 5 the signal is coded in steps 6 and 7 to produce coding according to psychoacoustic principles. By means of such psychoacoustic coding, spectral components which are not detected at a reproduction stage, in particular because of masking effects, are weighted less strongly or are omitted during the coding process. This type of processing of the short-term spectrum may readily be accomplished, e.g., by means of a computer. FIG. 23, which will be discussed in detail subsequently, shows the amplitude plot of spectral lines of a short-term frequency spectrum of a signal transform at the output of step 5. The signal coded in this manner may be transmitted via a narrow-band transmission channel due to a reduction in the mean data rate. The transmission channel is followed by a receiver which performs essentially the inverse of the transmitter functions, including decoding. An analog signal eventually produced at the output of D/A converter 12 is not identical to an input analog signal in step 1, because in the coding process spectral components have been weighted differently or suppressed. The difference between such analog signals, however, is not noticed by a listener at the reproduction stage.

In procedure step 8 transformation inverse to that in procedure step 5 takes place while, however, with preceding data reduction, the signal subjected to this is a modified signal freed from psycho-acoustically redundant components. The result of the inverse transformation is again discrete-time signals in the form of blocks representing signal segments of a continuous signal. However, only half the original [scanning values] samples are present in the blocks.

In procedure step 9, the blocks are weighted with synthesis windows. The synthesis window functions are so designed that they again compensate the signal distortions which have come about as a result of the [weighting] overlapping with the analysis windows in procedure step 4. The synthesis window itself does not compensate for signal distortion, e.g., alias components, but its special location and combination with the analysis window causes the compensation. The signal distortion (alias components) is caused by the overlapping, not by the weighting. The synthesis window functions used here fulfill two criteria. Firstly, they complement themselves to one in the overlap region using the corresponding analysis windows. Secondly, the analysis window reflected in the center of the overlap region multiplied by the synthesis window for the block n in the difference with the analysis window reflected in the center of the overlap region multiplied by the synthesis window for the block n+1 in the overlap region is identical to zero. This latter criterion contains the compensation for the aliasing components. Steps 2 through 9 are performed serially for each block of 1024 samples. If the required results (see, for example, FIG. 11) from step 9 are present, the addition function of step 10 can be made, resulting in the continuous samples as indicated by step 11 (see, for example, the bottom of FIG. 11).

In procedure step 10 the blocks overlapping by 50 per cent are added, whereby the aliasing components in the two blocks to be superimposed appear with reversed preceding signs so that upon addition it compensates to zero.

In procedure step 11 the formation of continuous [scanning values] samples through joining the blocks to each other with the windowed signal segments is illustrated.

Finally, in the last procedure step, designated 12, conversion of the digital, coded [scanning values] samples into an analog signal is carried out, whereby, objectively, components are in fact missing but which, subjectively, is experienced as identical with the original signal.

In the further explanation the cosine or, respectively, the sine transformation is to serve as the basis of the multiply overlapping transformations. In addition, temporal continuous signals shall be assumed for all procedure descriptions. The transition to discrete-time signals can, separately from the further considerations, be carried out according to the generally known procedure.

The cosine transformation is defined as an integral transformation from the following pair of equations:

$$Fc(f) = Ac \int_0^\infty f(t)\cos(2\pi ft)dt \quad (1)$$

$$f(t) = Bc \int_0^\infty F(f)\cos(2\pi ft)df \quad (2)$$

Accordingly, the following applies for the sine transformation:

$$Fs(f) = As \int_0^\infty f(t)\sin(2\pi ft)dt \quad (3)$$

$$f(t) = Bs \int_0^\infty F(f)\sin(2\pi ft)df \quad (4)$$

The constants Ac, Bc, As and Bs serve for normalizing purposes and are not significant for the further considerations. Corresponding to the equations (1) through (4), the temporal function f(t) for the cosine or, respectively, the sine transformation shall only be different from zero for the case of t larger than 0. For a transformation with finite block length this can always be achieved through suitable selection of the coordinates origin.

The cosine and sine transformation can be traced back to the Fourier transformation, in that, for the cosine transformation, the even signal component is fed to a Fourier transformation and, respectively, the odd signal component for the sine transformation. Using this transfer, all theorems known for the Fourier transformation can also be utilized for the sine and cosine transformations.

The continuous [temporal] time domain signal is divided into segments corresponding to the block regions which, after transformation, sub-[scanning,] sampling transmission and inverse transformation, are fed to the overlapping summation. If the block length is designated TB, then the segments with 50 per cent overlap have the length TB/2, as shown in FIG. 2. The segments in temporal [sequence] order are designated with Ni.

If blocks with 50 per cent overlap are removed from the continuous signal so described by means of a simple rectangular window, then there result, for example, the blocks obvious from FIG. 3 for a cycle consisting of transformation, sub-[scanning] sampling, transmission and inverse transformation.

If the coordinates origin is so chosen that it coincides with the start of the transformation block, then the even or, respectively, odd signal component of such a transformation block multiplied by the factor 2 is, in this scheme, as shown in FIG. 4.

Here, the reflected signal components corresponding to the signal components Ni are designated Si. The negative sign with an odd signal component indicates that the reflected signal components appear negative in comparison to the corresponding original components.

Figure 5:
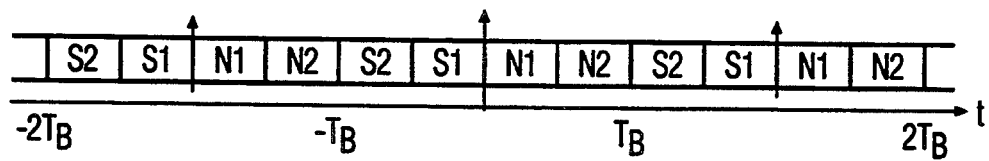
FIG. 5 shows a periodized even block signal component.

The scanning of the Fourier transformed variable of the even or odd signal component leads in the time domain to a periodizing of the corresponding signal components. If in the time domain no aliasing disturbance is to ensue, then the periodized signal components are not permitted to overlap. This means that in the spectrum, a [scanning] sampling period of $Fo=1/(2TB)$ must be used in the borderline case. This periodizing, with the aid of the scheme, for example, for the cosine transformation, leads to the situation shown in FIG. 5.

Figure 6:
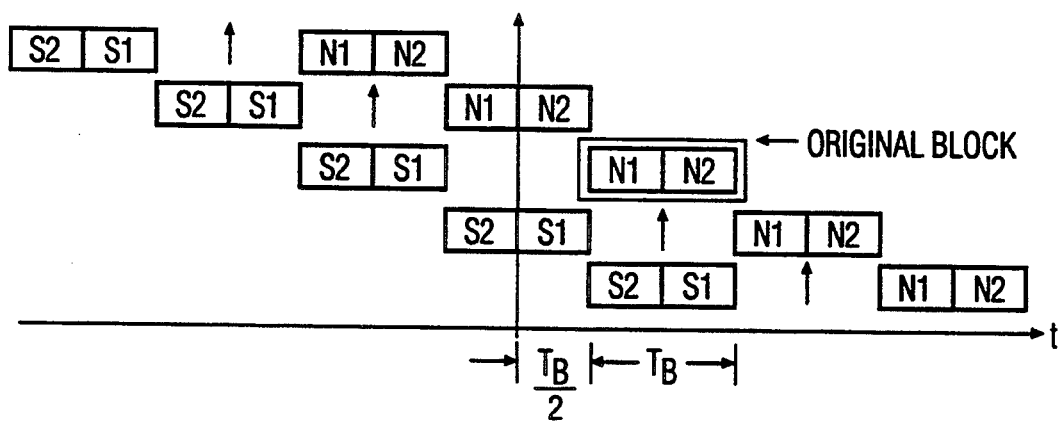
FIG. 6 shows [a] sub-[scanning] in the [spectrum] frequency domain by the factor 2 and offset to the coordinates origin of TB/2 in the time domain with cosine transformation.
Figure 7:
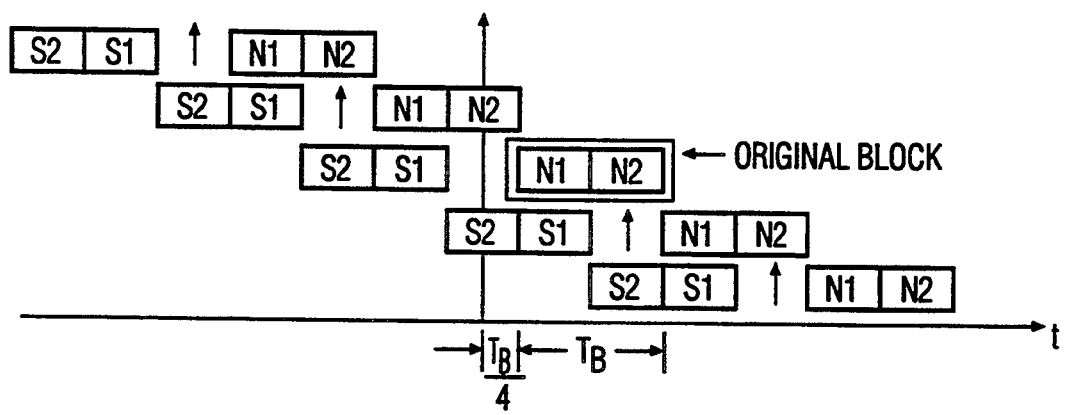
FIG. 7 shows sub-[scanning] sampling in the spectrum by the factor 2 and offset to the coordinates origin of TB/4 in the time domain with cosine transformation.

One degree of freedom, which until now was relatively arbitrarily established, is the position of the start of the block in the used coordinate system of the transformation. Up to now, the start of the block coincided with the zero point of the coordinate system. A shift in the start of the block towards positive times t in the coordinate system and the consequences of a sub-[scanning] sampling by the factor 2 in the spectrum, i.e., a [scanning] sampling period of $Fo=1/(2TB)$, is illustrated in FIGS. 6 and 7 using the example of the cosine transformation. Shown in FIG. 6 are the various signal components in the time domain after transformation, [subscanning] subsampling, transmission and inverse transformation with an offset of the transformation block from the coordinates origin of TB/2. The signal components with an offset of TB/4 are shown in FIG. 7.

From these two examples it can be seen what influence this important degree of freedom has on the components located in the region which is blanked out from the periodically repeated signal components using the synthesis window in the receiver. This time region has the duration TB in both representations and has the position characterized in the two pictures. The region of the synthesis window contains, firstly, the original signal segments N1 and N2 and, secondly, the aliasing components S1 and S2. FIGS. 6 and 7 show that the offset of the start of the block from the coordinates origin determines, on the one hand, at which point in the block region the signal components resulting from reflection appear but, on the other hand, has no influence on the signal components with a noninverted temporal position.

Figure 8:
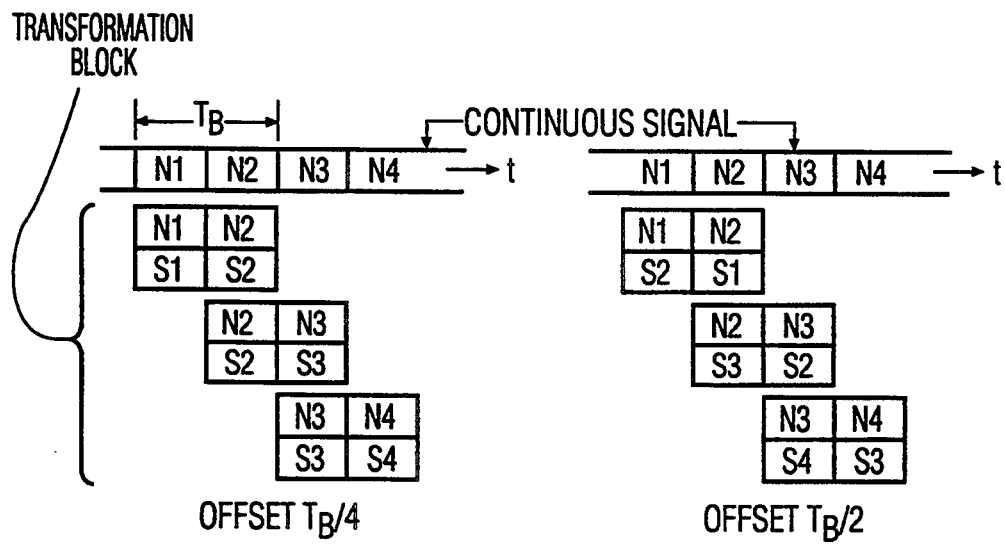
FIG. 8 shows signal components in the case of overlapping summation for various offsets of the block start to the coordinates origin.

As the method of aliasing compensation demands that the aliasing components are compensated through summation of the block overlap regions of the affected blocks, with double overlapping only those signal components may be located in one half of a block which originate from the same block half in the original signal. This requirement is not fulfilled by a temporal offset and size of TB/2 because here reflected signal components from the second half of the block occur in the first half and vice versa. In this case, with a block overlap, n components, originating from the overlap region $n-1$ as well as $n+1$, appear in the overlap region. As these components only appear once in the respective overlap region, they cannot compensate themselves. FIG. 8 shows, for successive blocks, which signal components are basically involved in the summation in the overlap region for offsets TB/2 and TB/4.

As only a temporal offset of TB/4 contains the basically correct components, in order to, on the one hand, create the wanted signal after a summation in the overlap region and, on the other hand, to compensate the aliasing components, this offset of the start of the block from the coordinates origin is used for the cosine or, respectively, the sine transformation.

Figure 9:
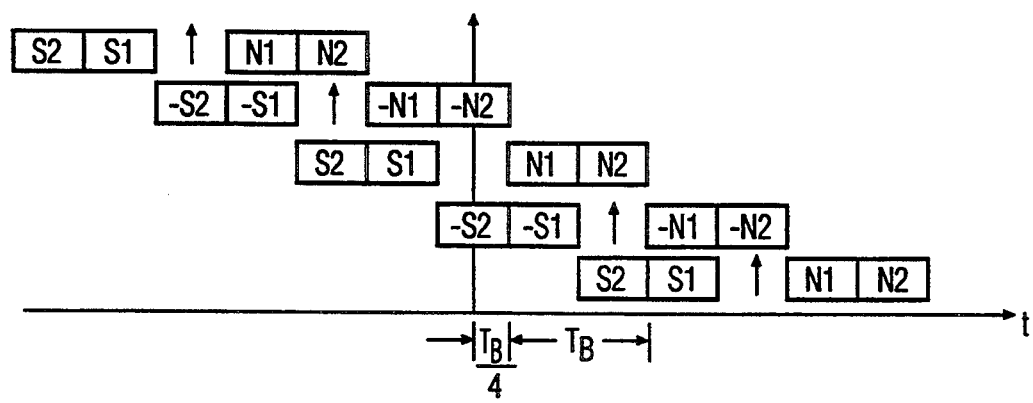
FIG. 9 shows sub-[scanning] sampling in the spectrum by the factor 2, offset to the coordinates origin of TB/4 in the time domain, and offset by half a [scanning] sampling period in the case of scanning in the frequency domain with cosine transformation.

A further degree of freedom is represented by the [scanning] sampling scheme in the frequency domain. Here, it is possible to either let the [scanning] sampling start at the frequency $f=0$ or, however, to introduce a [scanning] sampling offset corresponding to half the [scanning] sampling period during scanning in the frequency domain. Other offset dimensions lead to a doubling of the data rate through an asymmetric [scanning] sampling of the symmetrical image function for the cosine or, respectively, sine transformation in the Fourier spectral space. The offset by half the [scanning] sampling period with the [scanning] sampling in the spectrum effects an alternating change in preceding sign with the periodizing of the even or, respectively, the odd block component after transformation, sub-[scanning] sampling, transmission and inverse transformation in the time domain. FIG. 9 illustrates this with the scheme used for the cosine transformation.

Figure 10:
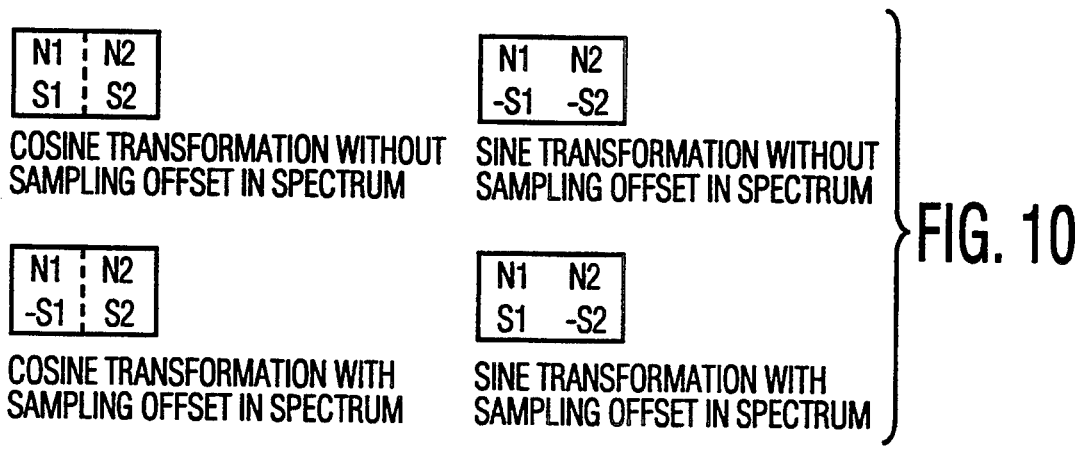
FIG. 10 shows signal components after transformation, sub-[scanning] sampling transmission and inverse transformation for various transformations.

It can be seen from FIGS. 7 and 9 which signal components for the cosine transformation after transformation, sub-[scanning] sampling, transmission and inverse transformation are located in the region which is blanked out with the synthesis window. If it is considered that, with the sine transformation, only the reflected components have a negative sign with regard to those with the cosine transformation, then, for this also, the signal components in the region of the synthesis window can be specified. In FIG. 10 the signal components located in the region of the synthesis window after transformation, sub-[scanning] sampling transmission and inverse transformation are specified for the four possible transformation variations: cosine transformation with and without [scanning] sampling offset in the spectrum as well as sine transformation with and without [scanning] sampling offset in the spectrum. In the case of a two-fold overlapping (N=2) of the windows, every Nth (2nd) sample value is omitted, producing two-fold subsampling in the transform output. In single overlapping (N=1), every value is sampled.

The expression "reflected" as used in the preceding description means "mirrored". The mirrored effect arises automatically if values are samples. e.g., repeat spectra. No special use is made of the mirrored components. The overlapping i.e., the twofold evaluation of the input samples, together with a two fold subsampling in the frequency domain, leads to the same number of output samples.

Figure 11:
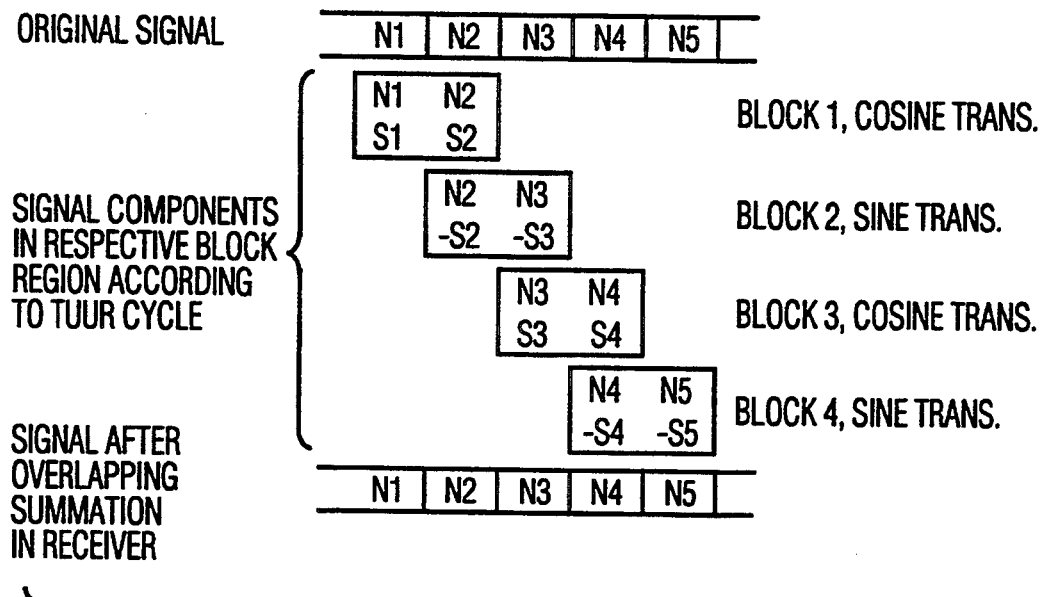
FIG. 11 shows signal reconstruction with 50 per cent overlap.

In FIG. 11 the mechanism for the aliasing compensation of several successive blocks is shown using an offset of TB/4. From the possible transformation variations, alternating cosine and sine transformation without [scanning] sampling offset in the frequency domain is to be applied here with temporally successive blocks. Thus, one of the aliasing components receives a positive sign and the other component receives a negative sign.

In the above-mentioned example, rectangular windows were used as analysis and synthesis window functions. However, these windows show an extremely poor behavior with respect to selectivity in the spectral domain. Better results are achieved if window functions with "soft" edges are used for analysis and synthesis.

When using window functions which deviate from the rectangular window function, two conditions must be observed.
1. the wanted signal must be correctly reconstructed by the overlapping;
2. the aliasing disturbance must further be compensated.

In order to be able to set up the equations necessary for maintaining these two conditions the technique to be used must correspond and supplement the [tehnicque] technique described above.

Figure 12:
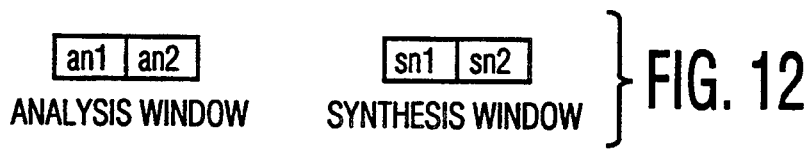
FIG. 12 shows segmentation of analysis and synthesis windows.

When the analysis window and the synthesis window are segmented in the same way as the signal, then a situation according to that of FIG. 12 results. Corresponding to the signal components, the components of the analysis or, respectively, the synthesis window, present in a temporally regular arrangement, are now designated with an1 and sn1 respectively. Components of the analysis window, temporally inverted owing to the reflection, are designated asi. If the window segments, which were involved in the reconstruction of the respective signal components, are now inserted into FIG. 11, then a situation according to that of FIG. 13 results. The equations, which must be met by the analysis and synthesis functions so that, after the summation in the overlap region, the signal is itself reconstructed on the one hand and the aliasing disturbances are compensated on the other, can be read off from this representation with the aid of FIG. 11.

Figure 13:
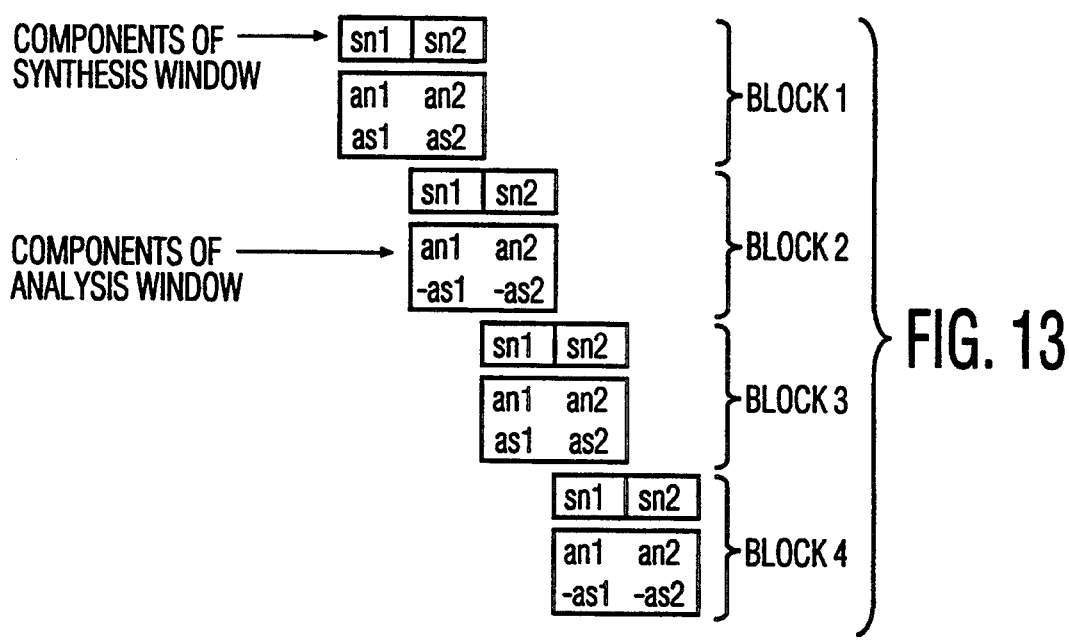
FIG. 13 shows components of the analysis and synthesis windows in the respective block region.

Two equations for the regions of the block overlaps result from FIG. 13:

$$an1*sn1+an2*sn2=1 \text{ (reconstruction rule)} \quad (5)$$

$$-as1*sn1+as2*sn2=0 \text{ (compensation rule)} \quad (6)$$

If with all temporally successive transformations identical window functions are used and if the analysis window functions are designated a(x), where x is a standardized time which has the value 0 at the start of the block and the value 1 at the end of the block, as well as if the synthesis function is designated with s(x), then using the equations (5) and (6) for the overlap regions 0 less or x less or 0.5 we get:

$$a(x)*s+a(x+0.5)*s(x+0.5)=1 \quad (7)$$

$$a(0.5-x)*s(x)-a(1-x)*s(0.5+x)=0 \quad (8)$$

These two equations must be fulfilled by the window functions. If the special case is chosen in which the window functions are symmetrical about the center of the block and it is assumed that the analysis window function is predetermined, then a construction rule for the synthesis window function results from the equations (7) and (8):

$$s(x) = \frac{a(x)}{a^2(x) + a^2(x + 0.5)} \quad (9)$$

Following this, the method explained through the example of the double overlap will be systematically extended to larger block overlaps, namely the quadruple and eightfold overlap.

Figure 14:
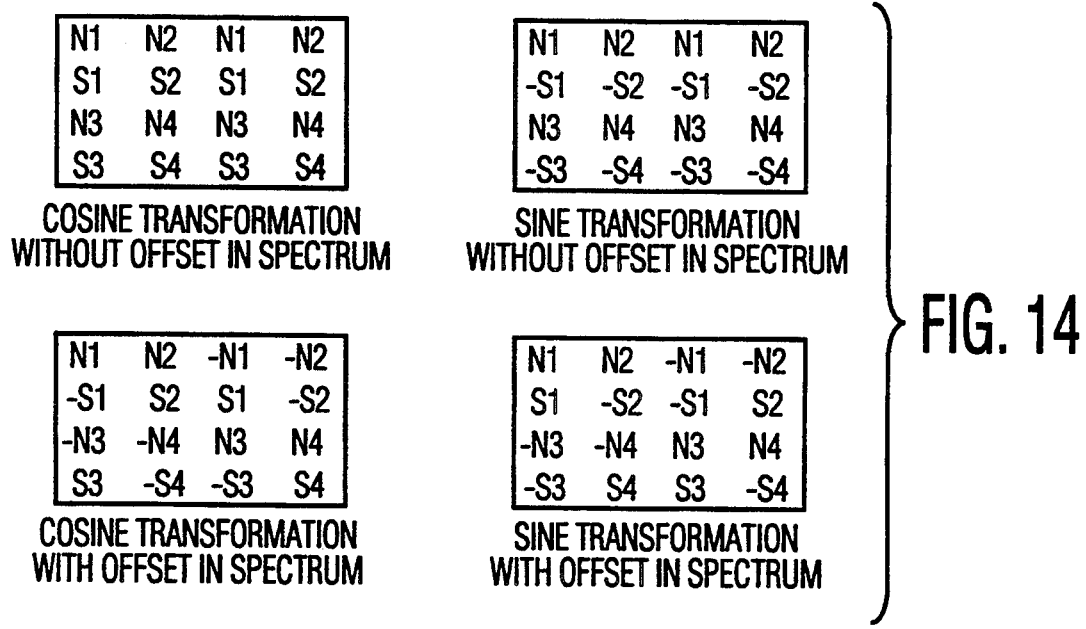
FIG. 14 shows signal components after transformation, sub-[scanning] sampling, transmission and inverse transformation in the synthesis window region for various transformations with quadruple block overlapping.

The degrees of freedom, shifting of the block zero point in the temporal coordinate system and offset with the [scanning] sampling in the spectral region are determined according to the above considerations. This leads to a shifting of the block zero point with respect to the coordinates origin by one eighth of the block length TB. The offset zero and the shifting by half a [scanning] sampling period during scanning in the spectrum are also permitted in this case. Consequently, four transformation modifications result from the quadruple block overlap. The signal components located in the region of the synthesis window after transformation, sub-[scanning] sampling, transmission and inverse transformation, firstly using rectangular window functions for analysis and synthesis, are shown in FIG. 14 for all valid transformations. Similarly to the case of the double overlap, a segmentation of the signal was carried out here with the temporal expansion of the common overlap region of TB/4.

Under the precondition of the aliasing compensation with the application of rectangular windows for analysis and synthesis, there results the following temporal transformation sequence:
1. sine transformation with sub-[scanning] sampling by the factor 4, offset by TB/8 in the time domain and offset by half a [scanning] sampling period with [scanning] sampling in the spectrum;
2. sine transformation with sub-[scanning] sampling by the factor 4, offset by TB/8 in the time domain and no offset with [scanning] sampling in the spectrum;
3. cosine transformation with sub-[scanning] sampling by the factor 4, offset by TB/8 in the time domain and offset by half a [scanning] sampling period with [scanning] sampling in the spectrum;
4. cosine transformation with sub-[scanning] sampling by the factor 4, offset by TB/8 in the time domain and no offset with [scanning] sampling in the spectrum.

When temporal transformation sequence is employed, then, using the scheme already used before, the situation shown in FIG. 15 results.

If we also again perform an appropriate segmentation for analysis and synthesis windows using the designations an1, as1 and sn1 for the individual segments in original temporal arrangement and in temporally inverted arrangement, then we can also specify the equations here which have to be generally fulfilled by the window functions:

$$an1^*sn1 + an2^*sn2 - an3^*sn3 + an4^*sn4 = 1 \quad (10)$$

$$as1^*sn1 + as2^*sn2 - as3^*sn3 - as4^*sn4 = 0 \quad (11)$$

$$an1^*sn3 = an2^*sn4 \quad (12)$$

$$an3^*sn1 = an4^*sn2 \quad (13)$$

$$as1^*sn3 = as2^*sn4 \quad (14)$$

$$as3^*sn1 = as4^*sn2 \quad (15)$$

If, for reasons of simplification, it is again assumed, that the window functions are always functions symmetric about the block center, then a constructional rule is gained from the equations (12) through (15) which must be met by the analysis window. This rule is specified in a form whereby x again corresponds to the standardized time. It is summarized in the equations (16) and (17):

$$a(0.5-x)^*a(x) = a(0.25+x)^*a(0.25-x) \quad (16)$$

$$a(1-x)^*a(x+0.5) = a(0.75+x)^*a(0.75-x) \quad (17)$$

for $[0</=x</=0.25]$ $0 \leq x \leq 0.25$

By specifying an analysis window which meets the rules (16) and (17), a corresponding synthesis window can be calculated using the system of equations (1*):

$$\begin{vmatrix} 0 & 0 & an1 & -an2 \\ an1 & an2 & an3 & an4 \\ an4 & an3 & an2 & an1 \\ an3 & -an4 & 0 & 0 \end{vmatrix} * \begin{vmatrix} sn1 \\ sn2 \\ sn3 \\ sn4 \end{vmatrix} = \begin{vmatrix} 0 \\ 1 \\ 0 \\ 0 \end{vmatrix} \quad (18)$$

If it is not assumed that an aliasing compensation is to be present with the application of rectangular windows but, rather, that the aliasing components only compensate when using a certain window function which is different from a rectangular window, then we can deviate from the temporal transformation sequence specified above and apply any arbitrary transformation sequence. By using another transformation sequence the equations (10) through (15) alter if necessary and hence the constructional rules for analysis and synthesis windows. However, as the signal components with all transformations are the same in the region of the synthesis window and are merely differentiated by their preceding signs, the structure of the equations (10) through (15) with their segments of analysis and synthesis windows remains and only the signs in these six equations alter through a temporally different transformation sequence. However, this means for the constructional rule in equations (16) and (17), which must be met by the analysis window, that here there are basically only two different rules. Firstly, the one specified in equations (16) and (17); secondly, one with a negative sign on one side of the equals sign in both equations. As an example of such a case the alternating application of sine and cosine transformation without [scanning] sampling offset in the spectrum is to be specified. FIG. 16 illustrates the scheme with this transformation sequence with the precondition of rectangular windows for analysis and synthesis.

The equations for the analysis and synthesis windows then read accordingly:

$$an1^*sn1 + an2^*sn2 + an3^*sn3 + an4^*sn4 = 1 \quad (19)$$

$$an1^*sn1 - as2^*sn2 + an3^*sn3 - as4^*sn4 = 0 \quad (20)$$

$$an1^*sn3 = -an2^*sn4 \quad (21)$$

$$an3^*sn1 = -an4^*sn2 \quad (22)$$

$$as1^*sn3 = as2^*sn4 \quad (23)$$

$$as3^*sn1 = as4^*sn2 \quad (24)$$

and hence the constructional rule for the analysis window:

$$a(0.5-x)^*a(x) = -a(0.25+x)^*a(0.25-x) \quad (25)$$

$$a(1-x)^*a(x+0.5) = -a(0.75+x)^*a(0.75-x) \quad (26)$$

for $[0</=x</=$ or $0.15]$ $0 \leq x \leq 0.15$.

The considerations made in conjunction with the quadruple overlap can be systematically transferred to higher degrees of overlapping, for example, the eight-fold overlap. The offset between the start of the block and the zero point of the coordinate system now has the size TB/16. Furthermore, again only the four transformation variations can be used like with the quadruple block overlap. It is also valid that the temporal transformation sequence only has an influence on the preceding signs of the signal components, not, however, on their temporal position in the region of the synthesis window after transformation, sub-[scanning] sampling, transmission and inverse transformation.

Fourteen (14) equations which must be fulfilled by analysis and synthesis windows result from similar considerations for the following transformation sequence:

1. sine transformation with sub-[scanning] sampling by the factor 4, offset by TB/8 in the time domain and offset by half a [scanning] sampling period with [scanning] sampling of the spectrum;
2. sine transformation with sub-[scanning] sampling by the factor 4, offset by TB/8 in the time domain and no offset with [scanning] sampling of the spectrum;
3. cosine transformation with sub-[scanning] sampling by the factor 4, offset by TB/8 in the time domain and offset by half a [scanning] sampling period with [scanning] sampling of the spectrum;
4. cosine transformation with sub-[scanning] sampling by the factor 4, offset by TB/8 in the time domain and no offset with [scanning] sampling of the spectrum;

Three equations, to be understood as conditions to be fulfilled by the analysis window, can be extracted from this. The conditions are as follows with the precondition of axis-symmetrical analysis and synthesis window functions:

$$a(x)^*(0.25-x) = a(0.125+x)^*a(0.125-x) \quad (27)$$

$$a(x)*a(0.5-x)+a(0.125+x)*a(0.375-x)+a(0.25+x)*a(0.25-x)+a(0.375+x)*a(0.125-x)=0 \quad (28)$$

$$a(x)*a(0.25 + x) + a(0.25 + x)*a(0.5 - x) + \quad (29)$$
$$a(0.5 - x)*a(0.25 - x) = a(0.125 + x)*a(0.375 + x) +$$
$$a(0.375 + x)*a(0.375 - x) + a(0.375 - x)*a(0.125 - x)$$

for $[0</=x</=0.125]$ $0 \leq x < 0.125$.

If a window function a(x) is found which fulfills the above three conditions, then the synthesis window can be calculated via the system of equations (30):

$$\begin{vmatrix} 0 & 0 & 0 & 0 & 0 & 0 & an1 & -an2 \\ 0 & 0 & 0 & 0 & an1 & an2 & an3 & an4 \\ 0 & 0 & an1 & -an2 & an3 & -an4 & an5 & -an6 \\ an1 & an2 & an3 & an4 & an5 & an6 & an7 & an8 \\ an8 & an7 & -an6 & -an5 & an4 & an3 & -an2 & -an1 \\ an3 & -an4 & an5 & -an6 & an7 & -an8 & 0 & 0 \\ an5 & an6 & an7 & an8 & 0 & 0 & 0 & 0 \\ an7 & -an8 & 0 & 0 & 0 & 0 & 0 & 0 \end{vmatrix} *$$

Equaton (30)

$$\begin{vmatrix} sn1 \\ sn2 \\ sn3 \\ sn4 \\ sn5 \\ sn6 \\ sn7 \\ sn8 \end{vmatrix} = \begin{vmatrix} 0 \\ 0 \\ 0 \\ 1 \\ 0 \\ 0 \\ 0 \\ 0 \end{vmatrix}$$

The solutions for the calculation of analysis and synthesis windows of the various block overlaps, given in the preceding sections, exhibit a systematic construction. This can be clearly recognized in the matrix equations (18) and, the conditions which the analysis window function must fulfill bring, with increasing overlapping, greater restrictions for a sensible window design.

Figure 17:
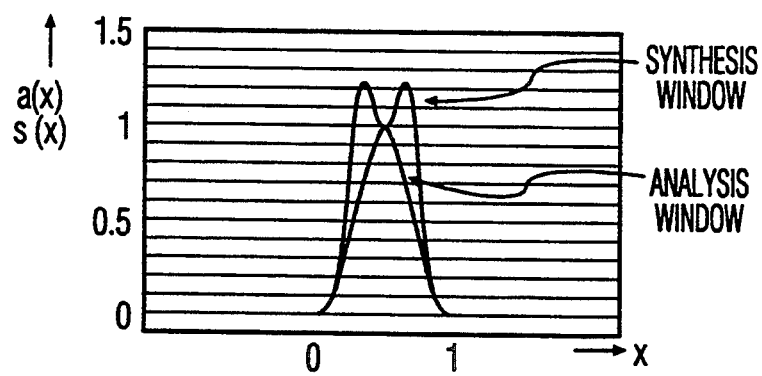
FIG. 17 shows double overlap in the time domain.

For the uniform comparison of the various block overlaps, a Kaiser window was selected as the basis. The Kaiser window was modified so that it satisfies the respective conditions for the overlapping transformation. This always happened through an expansion corresponding to the window conditions upon pre-determination of the Kaiser window function in a partial region of the window. In the case of the double overlap, the degrees of freedom for the analysis window are so large still that a complete Kaiser window can be selected here (FIG. 17). In the case of the quadruple overlap, the Kaiser window must be modified owing to the restricted degrees of freedom as described by equations (16) and (17). With the window construction in FIG. 18, a Kaiser window was pre-determined between the standardized time values $x=\frac{1}{8}$ and $x=\frac{7}{8}$ and the remaining window parts jointed on via the equations (16) and (17). As with increasing overlapping the restrictions for the analysis window become larger and larger, the Kaiser window can, in the case of the eightfold overlap (FIG. 19), only be pre-determined between $x=\frac{1}{4}$ and $x=\frac{3}{4}$. The remaining window parts must then be calculated by means of equations (27) through (29).

Figure 18:
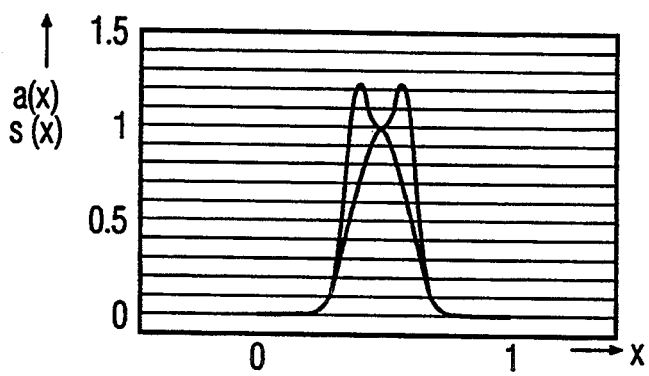
FIG. 18 shows quadruple overlap in the time domain.
Figure 19:
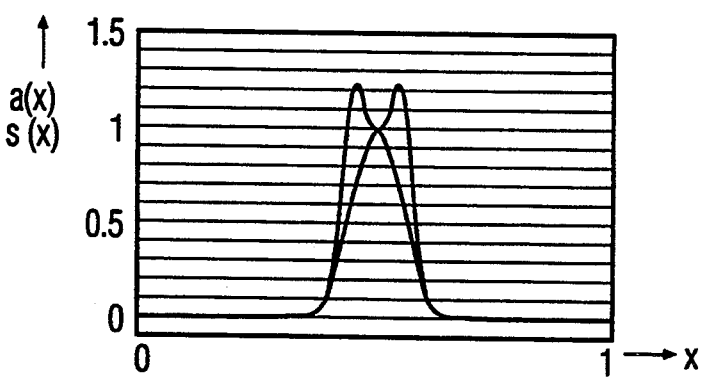
FIG. 19 shows eightfold overlap in the time domain.

FIGS. 17 through 22 show the temporal progression of the window function and the amount of the Fourier spectrum. The windows are so designed that the effective width of the window, i.e., the width of the window in which almost the entire energy of the window lies, is the same for all overlap sizes. This window width corresponds to the window width of the double overlap. The nominal window width doubles for every doubling of the overlap, as shown in FIGS. 17 through 19.

Figure 20:
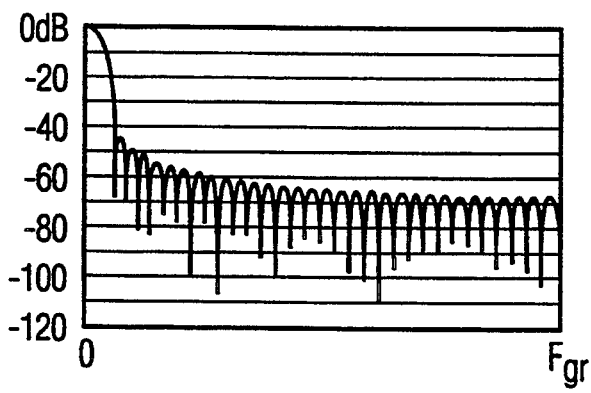
FIG. 20 shows double overlap in the frequency domain.
Figure 21:
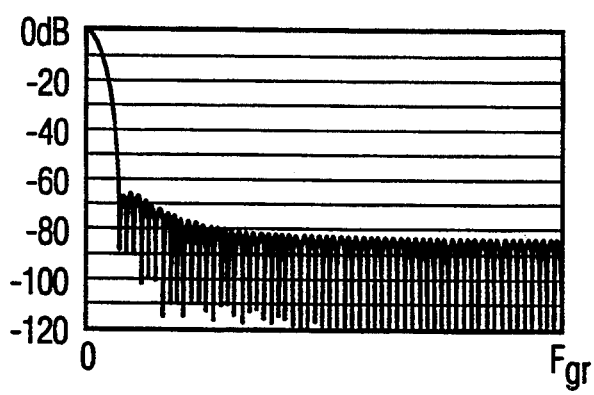
FIG. 21 shows quadruple overlap in the frequency domain,.
Figure 22:
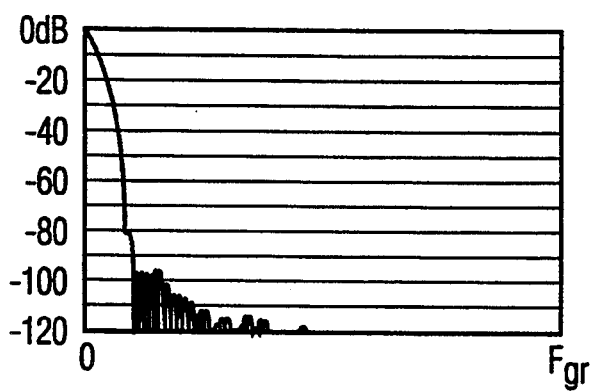
FIG. 22 shows eightfold overlap in the frequency domain.

By choosing the Kaiser window as the analysis window function, the corresponding synthesis windows receive a camber greater than one. This behavior must be considered when optimizing the windows on the basis of the respective application because, if applicable, disturbing components, which ensue upon coding the spectrum, can be slightly increased through this If all three time functions of the analysis window are compared with each other, then the almost identical progression in the region of the effective window width can be clearly seen. From this there results, in the spectrum, an identical width for the "main slope" of the amount progression for the Fourier transformed variable of the analysis window function. In FIGS. 20 through 22, the influence which the multiple overlap has on the chosen example can be clearly recognized. Ever smaller window edge values results from the respective doubling of the overlap and the lengthening of the original Kaiser window connected with this. Through this effect there results, in the spectrum, even greater attenuation into which the spectral progression grades after the "main slope". The window family should only be regarded as an example for the way of operation of the multiple overlap. The window design must be matched to the respective application case. This means, for example, for an analysis window for the eightfold overlap, that through appropriate design the "main slope" becomes narrower if not such a large attenuation is required after the "main slope".

FIG. 23 shows the amplitude plot of the spectral lines of a short-time frequency spectrum, as obtained at the output of state 5 in FIG. 1. The whole frequency band of the short-time spectrum f1–f15 is subdivided into a plurality of frequency groups f1–f2, f2–f4, f4–f12, f12–f14 and f14–f15. In the individual frequency groups, the spectral lines are examined and weighted according to psychacoustic principles. Only the dominant amplitude values are transmitted, irrelevant amplitude values are weighted less strongly or suppressed. The absolute maximum 15 of the whole frequency band is first transmitted as an absolute value with 12–16 bits. The maxima 14, 16, 17, 18 of the remaining frequency groups are transmitted with an accuracy of 8 bits, i.e., in their relative position to absolute maximum 15. The remaining values 20–26 of the frequency group f4–f12 are related to maximum value 16, i.e. their deviation from maximum value 16 is transmitted. To this end the amplitude range is starting from maximum 16, subdivided into three ranges A1, A2, A3 each of 10 dB and one range A4 for the remainder. Signal values 16, 20, 21 or 22, 23 or 24 or 25, 26, lying in each case in an amplitude range are transmitted as an identical value. No distinction is therefore drawn between values 16, 20, 21 and 22, 23 and 25, 26. The amplitude values 25, 26 at frequencies f10, f11 which fall below the value of 30 dB below maximum 16, are set at zero. The phase of values 25, 26 is not transmitted. These spectral components would, because of their close position to value 16 and their small amplitude, in any case no longer be detectable by virtue of the masking effect. In practice, the whole frequency band f1-f15 is divided into 26 frequency groups, of which only 5 are shown in FIG. 23 for the sake of simplicity. Due to dividing into amplitude ranges A1, A2, A3, A4, a total of 2 bits is sufficient for the transmission of amplitude values 20-26 relative to maximum 16. For each transmitted amplitude value which lies in the ranges A1 to A3, 2 bits are transmitted for the associated phase value.

A considerable reduction in the amount of data required for transmission is already achieved by the coarse quantization of the amplitude and phase values with 2 bits. An additional saving of bits is also made during transmission by dropping components, namely the phase values for amplitude values 25, 26 in frequency group f4-f12. The liberated bits may be used for the transmission of a more detailed amplitude subdivision in ranges A1-A3. To this end, for example, each range A1-A3 is divided into two ranges of 5 dB each. Moreover, there is assigned to each frequency value 20-24 a bit which indicates whether the amplitude value, e.g. 20, 21, lies within the first 5 dB or the second 5 dB below maximum 16. The assignment of these bits takes place on the basis of a table 28 which is created at the transmitter and is reconstructable at a receiver. To this end there is placed over the whole plot of the frequency spectrum in FIG. 23 a grid 27 with gradation in stages of 6 dB. Amplitude values 20-24 are therefore assigned to this grid. Table 28 assigns to each amplitude value 20-24 a particular position in relation to maximum 16. Table 28 begins with the lowest frequency value and shows by means of the line the respective position in relation to the maximum of the corresponding frequency range.

If further free bits are available, a subdivision of the 5 dB ranges into 2.5 dB ranges will be carried out. The subdivision process may be continued indefinitely. The saving of bits and the use of these bits for refinement of resolution is termed adaptive quantization.

Figure 24A:
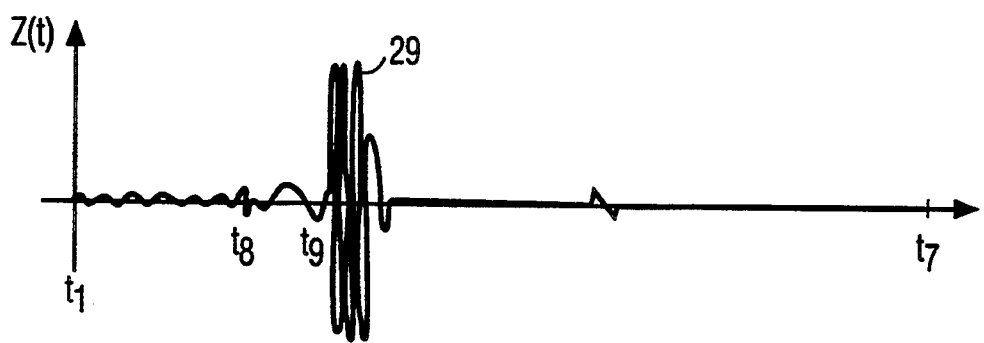
FIGS. 24A–C show waveforms associated with the processing of a sudden acoustic event.

FIG. 24A shows the pre-processing of a sudden acoustic event waveform 29 which occurs within a time window t1-t7 at a point in time t9. Such an acoustic event may be e.g. the striking of a musical instrument such as a triangle. The pre-processing takes place prior to step 5 frequency transformation. Acoustic event 29 is also preceded by a preshoot between t8 and t9, which is inaudible due to a preliminary masking. During conversion into the frequency spectrum in stage 5 in FIG. 1 there arises in each case in the frequency domain a signal which indicates the spectral distribution in window t1-t7. Since in the case of said signal the assignment of spectral lines to individual points in time within a time window no longer takes place, event 29 averaged over the whole time window t1-t9 would therefore seem to be blurred. An audible distortion may occur as a result.

Figure 24B:
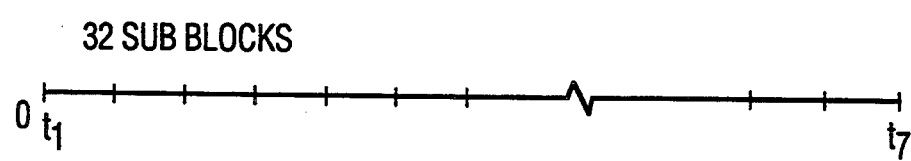
Figure 24C:
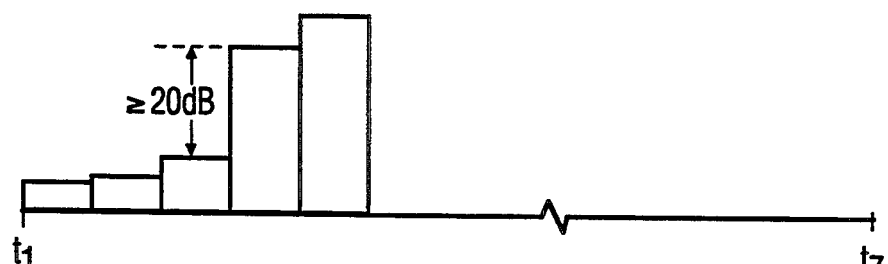

In order to prevent this possible defect, a time window t1-t7 or block is subdivided into 32 sub-blocks as shown in FIG. 24B. The amplitudes of the individual sub-blocks are determined. As soon as an amplitude increase of more than 20 dB occurs between two sub-blocks, produced in FIG. 24 by event 29, an additional measure will be triggered as shown in FIG. 24C. This measure consists in the fact that prior to the amplitude increase the signal is by means of a companding process, increased at the transmitter and correspondingly reduced again at the receiver. The above-mentioned defects caused by the blurring of the short-time event over the whole time window will thereby be reduced.

We claim:

1. A signal transmission method in which an analog signal is converted into a digital signal, transmitted in digital form and reconverted into an analog signal and whereby said digital signal is partitioned by means of overlapping time windows in temporally successive blocks which are each converted into a signal sequence representing a short-time spectrum, said method comprising the steps of a) windowing said digital signal and forming temporal blocks of block length TB with overlapping regions of relative size N-1/N where N=[2 to the power of n] $2^n$ for whole numbers of n, whereby overlapping blocks are selected each having a fixed number of samples;

b) transforming said samples of each block by subjecting individual ones of said blocks offset by TB/2*N in the time domain to a sine or cosine transformation respectively to produce transform output values;

c) sampling said transform output values at different positions, causing aliasing, said sampling comprising sampling said transform output values from N consecutive values according to a sampling scheme: C1: 0, N, 2N, 3N . . . , or a subsampling scheme C2: N/2, 3N/2 [/ whereby four combinations with respect to transformation and sub-scanning forms result:] resulting in four combinations of transformation and sampling forms K1-K4 as follows K1: cosine transformation+selection scheme C1
K2: cosine transformation+selection scheme C2
K3: sine transformation+selection scheme C1
K4: sine transformation+selection scheme C2;

d) arranging sampled transform output values so that said aliasing arises at predetermined positions, by applying one of said combinations K1 . . . K4 in any arbitrary permutation on each of overlapping blocks, whereby four groups of values with entries for overlapping regions of blocks results, said groups of values being differentiated by their preceding signs;

e) said arranging including selecting a combination from K1 . . . K4 so that after inverse transformation at a receiver and summation of the components in the signal segments of the blocks involved in the overlap, all signals not originating from the same segment of the original signal are compensated whereby said aliasing is cancelled in a receiver;

f) coding, transmission and decoding said sampled/-sub-sampled transform output values of individual blocks after said arranging;

g) subjecting decoded individual blocks to inverse sine or cosine transformation, producing inverse transform values;

h) arranging said inverse transform values so that non-aliased components corresponding to original input blocks are located in respective original positions, said arranging of said inverse transform values including segmentation of continuous-time inverse transform signal values into successive signal segments Ni for i=1, 2, 3 . . . , which, depending on the combination K1 . . . K4 used, contain components Ni . . . and temporally reflected alias components Si . . . ; and i) summing said signal segment components Ni . . . and said temporally reflected alias components Si . . . in the signal segments Ni of overlapping blocks.

2. A method according to claim 1, wherein:
   a. said blocks are evaluated using analysis windows prior to transformation and synthesis windows after transformation, and said windows form segments of length TB/N equal to said signal segments;
   b. said evaluation is performed by multiplying said signal components Ni . . . or, respectively, said temporally reflected components Si . . . corresponding to said signal components by components of analysis window ani . . . or, respectively, temporally reflected components asi . . . corresponding to these components and components of synthesis window sni . . . ; and
   c. said analysis and synthesis windows fulfill the following conditions in block overlap regions:
      I. the sum of temporal regular wanted signal components of an analysis window and synthesis window superimposed in signal segments of a block is equal to one;
      II. the sum of temporal regular aliasing components of an analysis window and synthesis window superimposed in signal segments of a block is equal to zero, 3. A method according to claim 2, wherein with said windows symmetric about a block center and with double overlapping, a synthesis window function is determined from a pre-determined analysis window function according to the following equation:

$$s(x) = \frac{a(x)}{a^2(x) - a^2(x - 0.5)}$$

for [0 less or x less or 0.5] $0 \leq x \leq 0.5$
where s(x) is a synthesis window function,
   a(x) is an analysis window function,
   x represents a standardized time with a value of 0 at the start of a block and a value of 1 at the end of said block.

4. A method according to claim 2, wherein with said windows symmetric about a block center and with quadruple overlapping, an analysis window function is first determined which fulfills the following equations:

$$a(0.5-x)*a(x)=a(0.25-x)*a(0.25-x)$$

$$a(1-x)*a(x-0.5)=a(0.75-x)*a(0.75-x)$$

for $0 \leq x \leq 0.25$
where a(x) is an analysis window function, and a synthesis window function is determined from a previously determined analysis window function according to the following equation:

$$\begin{vmatrix} 0 & 0 & an1 & -an2 \\ an1 & an2 & an3 & an4 \\ an4 & an3 & an2 & an1 \\ an3 & -an4 & 0 & 0 \end{vmatrix} * \begin{vmatrix} sn1 \\ sn2 \\ sn3 \\ sn4 \end{vmatrix} = \begin{vmatrix} 0 \\ 1 \\ 0 \\ 0 \end{vmatrix}$$

where
sni are components of a synthesis window function, ani are components of an analysis window function, x represents a standardized time with a value of 0 at the start of a block and a value of 1 at the end of said block.

5. A method according to claim 2, wherein with said windows symmetric about a block center and with eightfold overlapping, an analysis window function is first determined which fulfills the following equations:

$$a(x)*(0.25-x)=a(0.125+x)*a(0.125-x)$$

$$a(x)*a(0.5-x)+a(0.125+x)*a(0.375-x)+a(0.25+x)*a(0.25-x)+a(0.375-x)*a(0.125-x)=0$$

$$a(x)*(0.25 + x) + a(0.25 + x)*a(0.5 - x) +$$
$$a(0.5 - x)*a(0.25 - x) = a(0.125 + x)*a(0.375 + x) +$$
$$a(0.375 + x)*a(0.375 - x) + a(0.375 - x)*a(0.125 - x)$$

for $0 \leq x \leq 0.125$
where a(x) is an analysis window function, and a synthesis window function is determined from a previously determined analysis window function according to the following system of equations:

$$\begin{vmatrix} 0 & 0 & 0 & 0 & 0 & 0 & an1 & -an2 \\ 0 & 0 & 0 & 0 & an1 & an2 & an3 & an4 \\ 0 & 0 & an1 & -an2 & an3 & -an4 & an5 & -an6 \\ an1 & an2 & an3 & an4 & an5 & an6 & an7 & an8 \\ an8 & an7 & -an6 & -an5 & an4 & an3 & -an2 & -an1 \\ an3 & -an4 & an5 & -an6 & an7 & -an8 & 0 & 0 \\ an5 & an6 & an7 & an8 & 0 & 0 & 0 & 0 \\ an7 & -an8 & 0 & 0 & 0 & 0 & 0 & 0 \end{vmatrix} * \begin{vmatrix} sn1 \\ sn2 \\ sn3 \\ sn4 \\ sn5 \\ sn6 \\ sn7 \\ sn8 \end{vmatrix} = \begin{vmatrix} 0 \\ 0 \\ 0 \\ 1 \\ 0 \\ 0 \\ 0 \\ 0 \end{vmatrix}$$

where
sni are components of a synthesis window function, ani are components of an analysis window function, x represents a standardized time with a value of 0 at the start of a block and a value of 1 at the end of said block.

* * * * *

UNITED STATES PATENT AND TRADEMARK OFFICE
CERTIFICATE OF CORRECTION

PATENT NO. : 5,384,811
DATED : January 24, 1995
INVENTOR(S) : Gerhard Dickopp et al.

It is certified that error appears in the above-identified patent and that said Letters Patent is hereby corrected as shown below:

Column 16, claim 1, lines 14 and 15, after N=, delete "[2 to the power of n]"

Column 16, claim 1, lines 28 through 30, after 3N/2, delete "[/whereby four combinations with respect to transformation and sub-scanning forms result:]"

Signed and Sealed this

Twenty-eighth Day of November 1995

Attest:

BRUCE LEHMAN

Attesting Officer

Commissioner of Patents and Trademarks